(12) United States Patent
Hsu et al.

(10) Patent No.: US 12,073,039 B2
(45) Date of Patent: Aug. 27, 2024

(54) TOUCHPAD DEVICE (71) Applicant: ASUSTeK COMPUTER INC., Taipei (TW)

(72) Inventors: Ching-Fu Hsu, Taipei (TW); Wei-Ting Wong, Taipei (TW); Yi-Ou Wang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 27 days.

(21) Appl. No.: 17/503,504

(22) Filed: Oct. 18, 2021

(65) Prior Publication Data

US 2022/0137766 A1 May 5, 2022

(30) Foreign Application Priority Data

Oct. 29, 2020 (TW) ................... 109137723

(51) Int. Cl.
G06F 3/041 (2006.01)
(52) U.S. Cl.
CPC ................. G06F 3/04142 (2019.05)
(58) Field of Classification Search
CPC .................................... G06F 3/04142
See application file for complete search history.

(56) References Cited

U.S. PATENT DOCUMENTS

| 8,674,962 | B2 | 3/2014 | Chiang et al. |
| 10,503,261 | B2 | 12/2019 | Basehore et al. |
| 10,572,052 | B2 | 2/2020 | Wang et al. |
| 10,768,674 | B2 | 9/2020 | Lee et al. |
| 2011/0193813 | A1* | 8/2011 | Gralewski ............... G06F 3/041 345/173 |
| 2014/0035849 | A1* | 2/2014 | Jung ..................... G06F 3/0488 345/173 |
| 2018/0052350 | A1* | 2/2018 | Zhao ..................... G06F 3/0412 |
| 2018/0121005 | A1* | 5/2018 | Aberg .................. G06F 3/0488 |
| 2019/0187792 | A1* | 6/2019 | Basehore ................ G06F 3/017 |

(Continued)

FOREIGN PATENT DOCUMENTS

| CN | 103135832 B | 2/2016 |
| CN | 107003696 A | 8/2017 |
| CN | 107741791 A | 2/2018 |

(Continued)

*Primary Examiner* — Towfiq Elahi
(74) *Attorney, Agent, or Firm* — McClure, Qualey & Rodack, LLP (57) ABSTRACT

A touchpad device is provided in the disclosure. The touchpad device includes a touch circuit board, at least two pressure detecting elements, a touch control unit, and a pressure control unit. The touch circuit board includes a touchable zone. The at least two pressure detecting elements are located below the touch circuit board and correspond to at least one pressure sensitive input region in the touchable zone. The touch control unit is electrically connected to the touch circuit board and is configured to receive and process a touch signal from the touch circuit board to generate touch coordinate information. The pressure control unit is electrically connected to the pressure detecting elements and is configured to receive and process a pressure signal detected by the pressure detecting elements in the pressure sensitive input region to generate touch pressure information.

12 Claims, 7 Drawing Sheets

(56) References Cited

U.S. PATENT DOCUMENTS

2019/0391677 A1* 12/2019 Costante ................ H05K 1/181
2021/0278966 A1*  9/2021 Rosenberg .......... G06F 3/04186

FOREIGN PATENT DOCUMENTS

| CN | 108762567 A | 11/2018 |
| CN | 108762582 A | 11/2018 |
| CN | 105824468 B | 12/2018 |
| IN | 108762582 A | 11/2018 |
| TW | 200712993 A |  4/2007 |

* cited by examiner

TOUCHPAD DEVICE

CROSS-REFERENCE TO RELATED APPLICATION

This application claims the priority benefit of Taiwan Application Serial No. 109137723, filed on Oct. 29, 2020. The entirety of the above-mentioned patent application is hereby incorporated by reference herein and made a part of the specification.

BACKGROUND OF THE INVENTION

Field of the Invention

The disclosure is related to a touchpad device.

Description of the Related Art

With the increasing popularity and lightweight trend of notebook computers, fixed operating space of conventional touchpads gradually cannot satisfy users, so that large-sized touchpads become a new trend. While large-sized touchpads are provided, more diversified and intuitive input and feedback manners are further required.

BRIEF SUMMARY OF THE INVENTION

According to one aspect of the disclosure, a touchpad device is provided. The touchpad device includes a touch circuit board, at least two pressure detecting elements, a touch control unit, and a pressure control unit. The touch circuit board includes a touchable zone. The at least two pressure detecting elements are located below the touch circuit board and correspond to at least one pressure sensitive input region in the touchable zone. The touch control unit is electrically connected to the touch circuit board and is configured to receive and process a touch signal from the touch circuit board to generate touch coordinate information. The pressure control unit is electrically connected to the pressure detecting elements and is configured to receive and process a pressure signal detected by the pressure detecting elements in the pressure sensitive input region to generate touch pressure information.

To sum up, while providing a large-sized touchpad device, the disclosure provides a more diversified and intuitive input manner, and further provides a press feedback mechanism to meet requirements of users. In addition, the disclosure further reduces an overall thickness of the mechanism and conducts multi-region input scenarios.

DETAILED DESCRIPTION OF THE EMBODIMENTS

Figure 1:
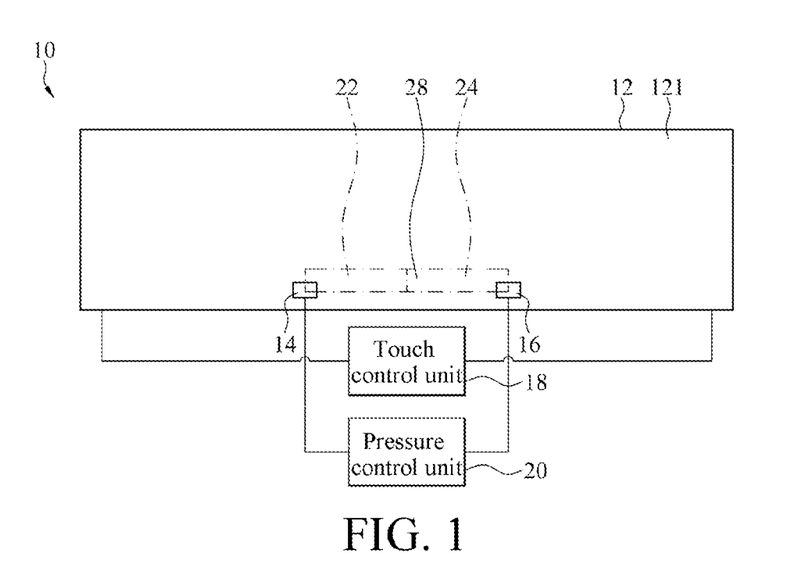
FIG. 1 is a schematic architectural diagram of a touchpad device according to a first embodiment of the disclosure.

FIG. 1 is a schematic architectural diagram of a touchpad device according to a first embodiment of the disclosure. Referring to FIG. 1, a touchpad device 10 includes a touch circuit board 12, at least two pressure detecting elements 14 and 16, a touch control unit 18, and a pressure control unit 20. The touch circuit board 12 includes a touchable zone 121. The at least two pressure detecting elements 14 and 16 are located below the touch circuit board 12 and correspond to at least one pressure sensitive input region in the touchable zone 121. In an embodiment, the pressure detecting element 14 corresponds to a pressure sensitive input region (left pressure sensitive input region) 22 for detecting a touch event occurring in the left pressure sensitive input region 22; and the pressure detecting element 16 corresponds to a pressure sensitive input region (right pressure sensitive input region) 24 for detecting a touch event occurring in the right pressure sensitive input region 24. In an embodiment, the left pressure sensitive input region 22 and the right pressure sensitive input region 24 are used to simulate physical left and right buttons on a conventional touchpad. The touch control unit 18 is electrically connected to the touch circuit board 12 and is configured to receive and process a touch signal from the touch circuit board 12 to generate corresponding touch coordinate information. The pressure control unit 20 is electrically connected to the pressure detecting elements 14 and 16 and is configured to receive and process a pressure signal detected by the pressure detecting elements 14 and 16 in the left pressure sensitive input region 22 or the right pressure sensitive input region 24 to generate corresponding touch pressure information. In an embodiment, the touch coordinate information and the touch pressure information are generated by touching the touchable zone 121 of the touch circuit board 12 with a finger or a touch input device such as a stylus.

When the touchable zone 121 is touched, the touch circuit board 12 detects X-axis and Y-axis coordinates of a touched position thereof, to then generate a touch signal and transmit the touch signal to the touch control unit 18, so that the touch control unit 18 performs parsing according to the touch signal to obtain the touch coordinate information. In addition, when the touch event occurs on the left pressure sensitive input region 22 or the right pressure sensitive input region 24 and includes a pressure action, the pressure detecting elements 14 and 16 detects the pressure action, to generate a pressure signal and transmit the pressure signal to the pressure control unit 20, so that the pressure control unit 20 performs parsing according to the pressure signal to obtain the corresponding touch pressure information. After obtaining the touch coordinate information and the touch pressure information, the firmware of the touch control unit 18, the pressure control unit 20 and corresponding application program interfaces (API) transmits the touch coordinate information and the touch pressure information to a host operating system (not shown in the figure), to execute various application programs.

Figure 2:
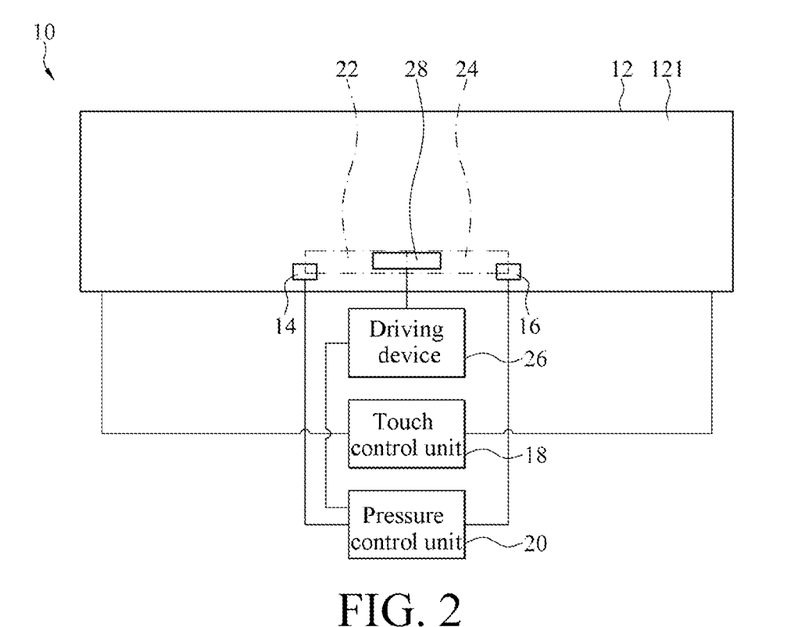
FIG. 2 is a schematic architectural diagram of a touchpad device according to a second embodiment of the disclosure.

To provide feedback to a user, the touchpad device 10 is further provided with at least one feedback element. The feedback element is an actuating feedback element, a sound feedback element, or a light-emitting feedback element. Referring to FIG. 2, the touchpad device 10 further includes a driving device 26 and an actuating feedback element 28. In this embodiment, one actuating feedback element 28 is used, but the type or a quantity of the feedback element are not limited thereto. The actuating feedback element 28 is located below the touch circuit board 12 and corresponds to both the left pressure sensitive input region 22 and the right pressure sensitive input region 24. In an embodiment, a vertical projection of the actuating feedback element 28 on the touch circuit board 12 overlaps adjacent regions of the left pressure sensitive input region 22 and the right pressure sensitive input region 24, but the disclosure is not limited thereto. The driving device 26 is electrically connected to the actuating feedback element 28 and the pressure control unit 20. The pressure control unit 20 enables the driving device 26 according to the pressure signal, so that the driving device 26 drives the actuating feedback element 28 to actuate and vibrate. When the user presses the left pressure sensitive input region 22, the corresponding pressure signal is detected by the pressure detecting element 14. The pressure detecting element 14 transmits the pressure signal to the pressure control unit 20. The pressure control unit 20 enables the driving device 26 according to the touch pressure information corresponding to the pressure signal, so that the driving device 26 drives the actuating feedback element 28 to generate feedback to the user. Similarly, the right pressure sensitive input region 24 also drives the actuating feedback element 28 to generate actuating feedback in the same manner. In an embodiment, the actuating feedback element 28 is alternatively a linear resonance actuator (LRA), a piezo actuator, an eccentric rotating mass (ERM) actuator, or a shape memory alloy impact actuator (SIA).

Figure 3:
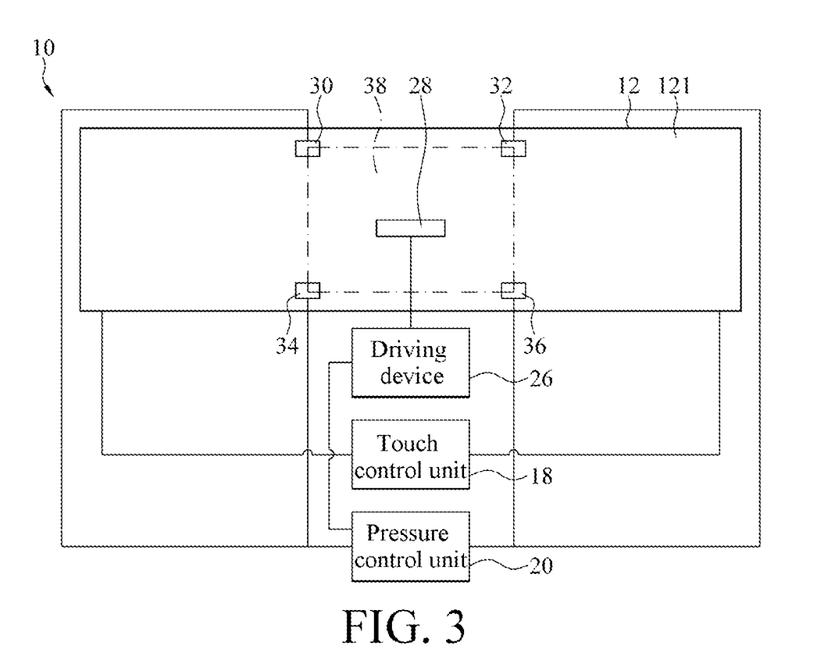
FIG. 3 is a schematic architectural diagram of a touchpad device according to a third embodiment of the disclosure.

In an embodiment, referring to FIG. 3, the touchpad device 10 includes a touch circuit board 12, four pressure detecting elements 30, 32, 34, and 36, a touch control unit 18, a pressure control unit 20, a driving device 26, and an actuating feedback element 28. The pressure control unit 20 is electrically connected to the four pressure detecting elements 30, 32, 34, and 36. The four pressure detecting elements 30, 32, 34, and 36 are located in a middle region below a touchable zone 121 to constitute a pressure sensitive input region 38 in the middle region of the touchable zone 121. The pressure detecting elements 30, 32, 34, and 36 are configured to detect a pressure signal generated in the pressure sensitive input region 38. The touch control unit 18 is electrically connected to the touch circuit board 12 and is configured to receive and process a touch signal from the touch circuit board 12 to generate corresponding touch coordinate information. The pressure control unit 20 is electrically connected to the pressure detecting elements 30, 32, 34, and 36, and is configured to receive and process a pressure signal detected by the pressure detecting elements 30, 32, 34, and 36 in the pressure sensitive input region 38 to generate corresponding touch pressure information. The actuating feedback element 28 is located below the touch circuit board 12 and corresponds to the pressure sensitive input region 38. Other connection relationships and actuation are the same as those in the previous embodiment, and thus are not repeated herein.

Figure 4:
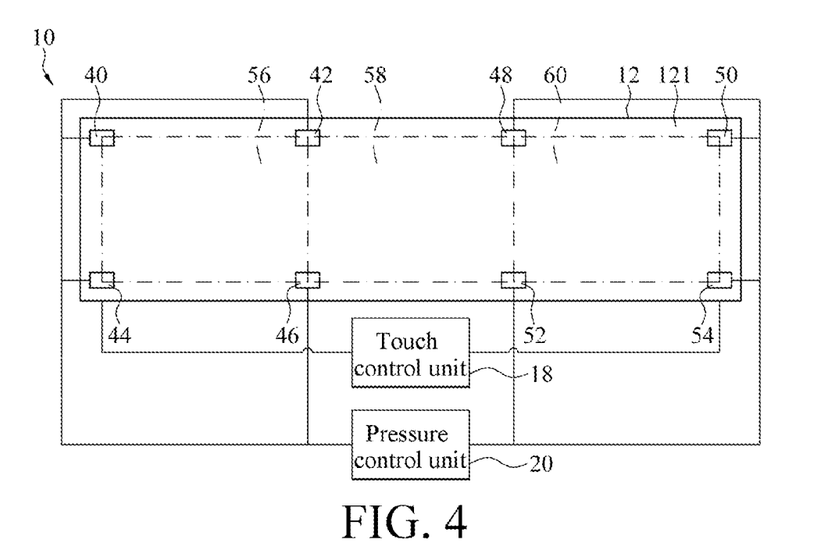
FIG. 4 is a schematic architectural diagram of a touchpad device according to a fourth embodiment of the disclosure.

The disclosure also provides a multi-region input, to use at least six pressure detecting elements to constitute at least two pressure sensitive input regions. In an embodiment, eight pressure detecting elements constitute three pressure sensitive input regions (a first pressure sensitive input region, a second pressure sensitive input region, and a third pressure sensitive input region), to describe an implementation of the multi-region input. Referring to FIG. 4, the touchpad device 10 includes a touch circuit board 12, eight pressure detecting elements 40 to 54, a touch control unit 18, and a pressure control unit 20. The eight pressure detecting elements 40 to 54 are located below the touch circuit board 12 and evenly arranged in the touchable zone 121, namely a first pressure detecting element 40, a second pressure detecting element 42, a third pressure detecting element 44, a fourth pressure detecting element 46, a fifth pressure detecting element 48, a sixth pressure detecting element 50, a seventh pressure detecting element 52, and an eighth pressure detecting element 54, to configure the touchable zone 121 to a first pressure sensitive input region 56, a second pressure sensitive input region 58, and a third pressure sensitive input region 60. The first pressure detecting element 40, the second pressure detecting element 42, the third pressure detecting element 44, and the fourth pressure detecting element 46 correspond to the first pressure sensitive input region 56, and are configured to detect a pressure signal generated on the first pressure sensitive input region 56. The second pressure detecting element 42, the fourth pressure detecting element 46, the fifth pressure detecting element 48, and the seventh pressure detecting element 52 correspond to the second pressure sensitive input region 58, and are configured to detect a pressure signal generated on the second pressure sensitive input region 58. The fifth pressure detecting element 48, the sixth pressure detecting element 50, the seventh pressure detecting element 52, and the eighth pressure detecting element 54 correspond to the third pressure sensitive input region 60, and are configured to detect a pressure signal generated on the third pressure sensitive input region 60. The touch control unit 18 is electrically connected to the touch circuit board 12 and is configured to receive and process a touch signal from the touch circuit board 12 to generate corresponding touch coordinate information. The pressure control unit 20 is electrically connected to the pressure detecting elements 40 to 54 and is configured to receive and process pressure signals detected by the pressure detecting elements 40 to 54 respectively in the first pressure sensitive input region 56, the second pressure sensitive input region 58, or the third pressure sensitive input region 60, to generate corresponding touch pressure information. In an embodiment, the first pressure sensitive input region 56 is a specific or predetermined function region, an application program region, or a stylus input region; the second pressure sensitive input region 58 is a general touchpad operating region; and the third pressure sensitive input region 60 is a numeric key input region.

When a touch input device (not shown in the figure) performs an operation in the touchable zone 121, a touch signal detected by the touch circuit board 12 includes X-axis and Y-axis coordinates of a position touched by the touch input device. The touch circuit board 12 transmits the detected touch signal to the touch control unit 18, and the touch control unit 18 performs parsing according to the touch signal to obtain the touch coordinate information.

When the touch input device generates a pressure action on the touchable zone 121 at the touch position that located in the first pressure sensitive input region 56, the second pressure sensitive input region 58, or the third pressure sensitive input region 60, the pressure signal is detected by at least one of the corresponding pressure detecting elements 40 to 54. The pressure signal is transmitted to the pressure control unit 20. The pressure control unit 20 performs parsing according to the pressure signal to obtain corresponding touch pressure information. The touch coordinate information and the touch pressure information, after being obtained, are transmitted to a host operating system via firmware of the touch control unit 18 and the pressure control unit 20 and corresponding application program interfaces (API), to execute various application programs.

Figure 5:
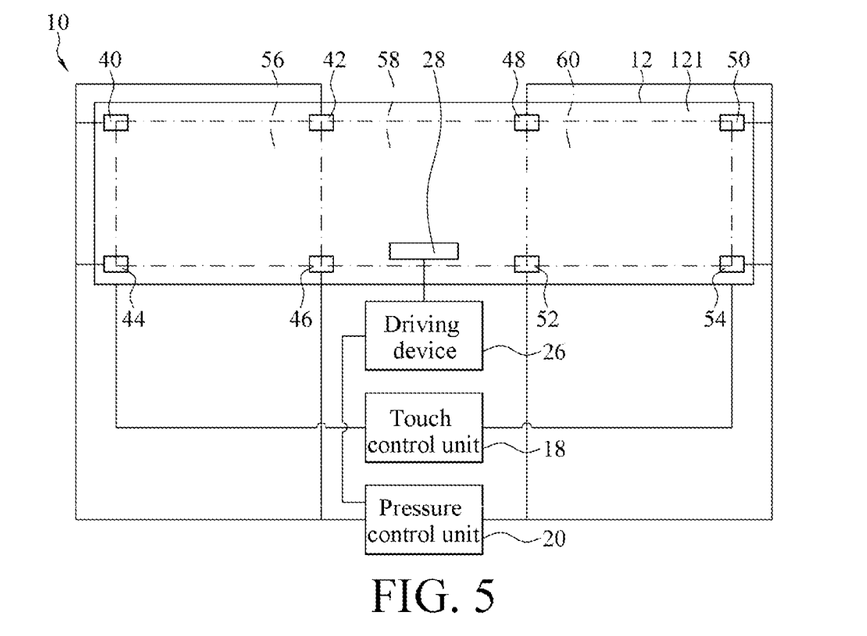
FIG. 5 is a schematic architectural diagram of a touchpad device according to a fifth embodiment of the disclosure.

In an embodiment, the touchpad device 10 shown in FIG. 4 is further provided with an actuating feedback element 28. Referring to FIG. 5, the actuating feedback element 28 is located below the touch circuit board 12, and a vertical projection of the actuating feedback element 28 on the touch circuit board 12 overlaps the second pressure sensitive input region 58 in the middle of the touch circuit board 12, but the disclosure is not limited thereto. The driving device 26 is electrically connected to the actuating feedback element 28 and the pressure control unit 20. The pressure control unit 20 enables the driving device 26 according to the touch pressure information, so that the driving device 26 drives the actuating feedback element 28 to actuate and vibrate. When pressure signals generated by the pressure detecting elements 40 to 54 are interpreted by the pressure control unit 20, and it is detected that any of the first pressure sensitive input region 56, the second pressure sensitive input region 58, or the third pressure sensitive input region 60 needs actuating feedback, the pressure control unit 20 enables the driving device 26, so that the driving device 26 controls the actuating feedback element 28 to actuate to generate vibration feedback to the user.

Figure 6:
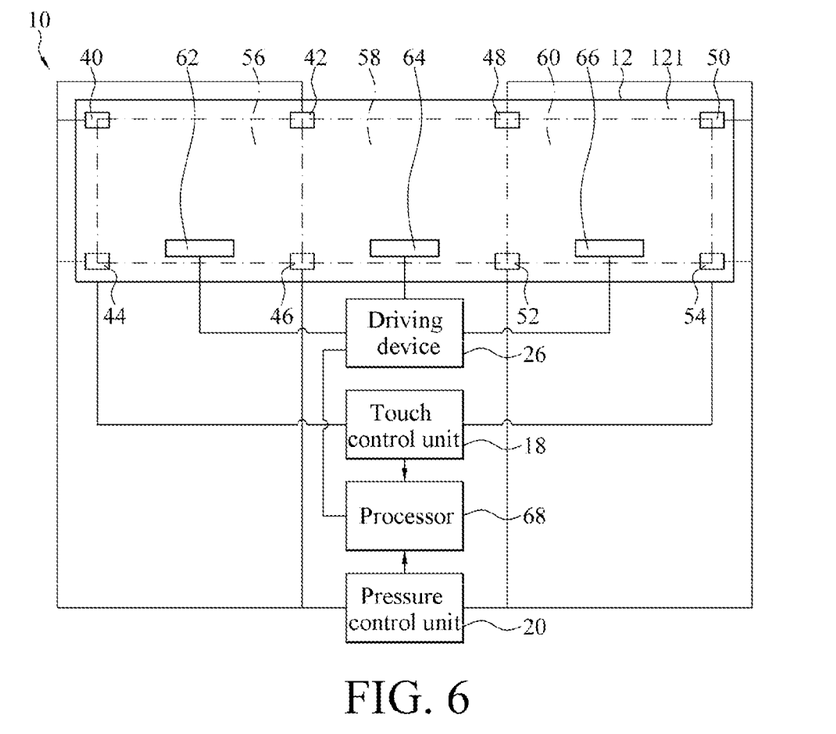
FIG. 6 is a schematic architectural diagram of a touchpad device according to a sixth embodiment of the disclosure.

In an embodiment, referring to FIG. 6, the touchpad device 10 includes a touch circuit board 12, pressure detecting elements 40 to 54, a touch control unit 18, a pressure control unit 20, three actuating feedback elements 62, 64, and 66, a driving device 26, and a processor 68. The actuating feedback element 62 is located below the touch circuit board 12, and a vertical projection of the actuating feedback element 62 on the touch circuit board 12 overlaps the first pressure sensitive input region 56 in the touch circuit board 12. The actuating feedback element 64 is located below the touch circuit board 12, and a vertical projection of the actuating feedback element 64 on the touch circuit board 12 overlaps the second pressure sensitive input region 58 in the touch circuit board 12. The actuating feedback element 66 is located below the touch circuit board 12, and a vertical projection of the actuating feedback element 66 on the touch circuit board 12 overlaps the third pressure sensitive input region 60 in the touch circuit board 12. The actuating feedback elements 62, 64, and 66 are all electrically connected to the driving device 26. The processor 68 is electrically connected to the touch control unit 18, the pressure control unit 20, and the driving device 26. After the touch control unit 18 generates the touch coordinate information according to the touch signal, and the pressure control unit 20 generates the touch pressure information according to the pressure signal, the touch coordinate information and the touch pressure information are transmitted to the processor 68. The processor 68 determines, according to the received touch coordinate information and touch pressure information, that a pressure signal is generated in the first pressure sensitive input region 56, the second pressure sensitive input region 58, or the third pressure sensitive input region 60 in which a corresponding touch occurs, to generate a control signal to the driving device 26, so that the driving device 26 drives the corresponding actuating feedback elements 62, 64, or 66 in the first pressure sensitive input region 56, the second pressure sensitive input region 58, or the third pressure sensitive input region 60 to generate an action.

Figure 7:
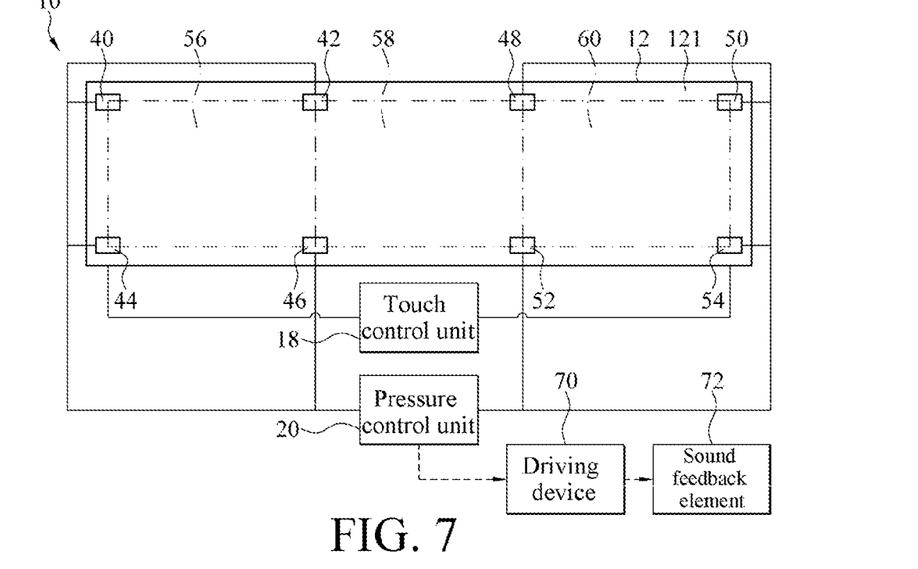
FIG. 7 is a schematic architectural diagram of a touchpad device according to a seventh embodiment of the disclosure.

In an embodiment, referring to FIG. 7, in addition to a touch circuit board 12, pressure detecting elements 40 to 54, a touch control unit 18, and a pressure control unit 20, the touchpad device 10 further includes a driving device 70 and a sound feedback element 72. The driving device 70 is electrically connected to the sound feedback element 72 and the pressure control unit 20. In an embodiment, the sound feedback element 72 is a speaker. The pressure control unit 20 enables the driving device 70 according to the touch pressure information, so that the driving device 70 drives the sound feedback element 72 to actuate. When the pressure control unit 20 determines any one of the first pressure sensitive input region 56, the second pressure sensitive input region 58, or the third pressure sensitive input region 60 needs feedback according to the pressure signals generated by the pressure detecting elements 40 to 54, the pressure control unit 20 enables the driving device 70, so that the driving device 70 drives the sound feedback element 72 to actuate and produce sound, to generate sound feedback to the user.

Figure 8:
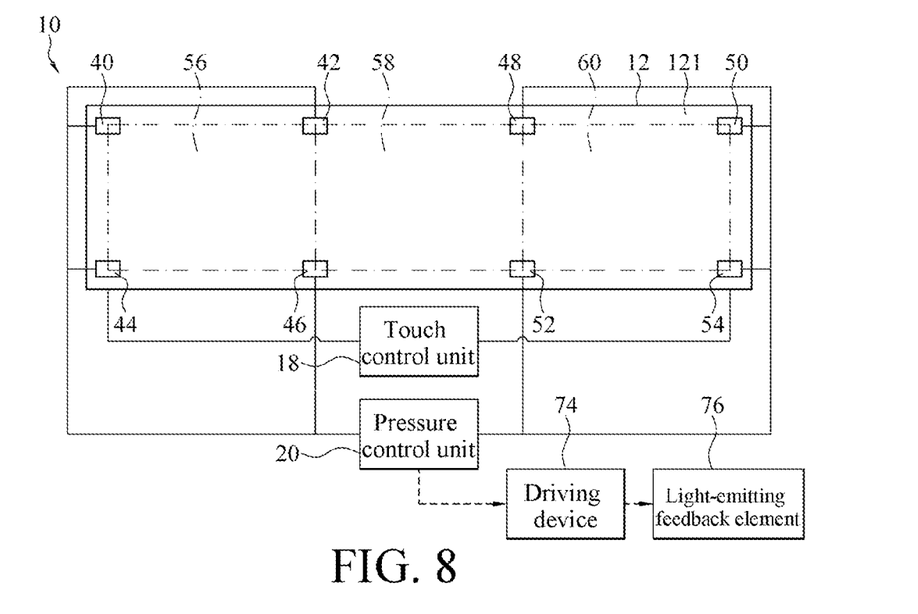
FIG. 8 is a schematic architectural diagram of a touchpad device according to an eighth embodiment of the disclosure.

In an embodiment, referring to FIG. 8, in addition to a touch circuit board 12, pressure detecting elements 40 to 54, a touch control unit 18, and a pressure control unit 20, the touchpad device 10 further includes a driving device 74 and a light-emitting feedback element 76. The driving device 74 is electrically connected to the light-emitting feedback element 76 and the pressure control unit 20. In an embodiment, the light-emitting feedback element 76 is a light-emitting diode (LED). The pressure control unit 20 enables the driving device 74 according to the touch pressure information, so that the driving device 74 drives the light-emitting feedback element 76 to actuate. When pressure signals generated by the pressure detecting elements 40 to 54 are interpreted by the pressure control unit 20 and it is detected that any of the first pressure sensitive input region 56, the second pressure sensitive input region 58, or the third pressure sensitive input region 60 needs feedback, the pressure control unit 20 enables the driving device 74, so that the driving device 74 drives the light-emitting feedback element 76 to actuate and emit light or blink, to generate light-emitting feedback to the user.

Figure 9:
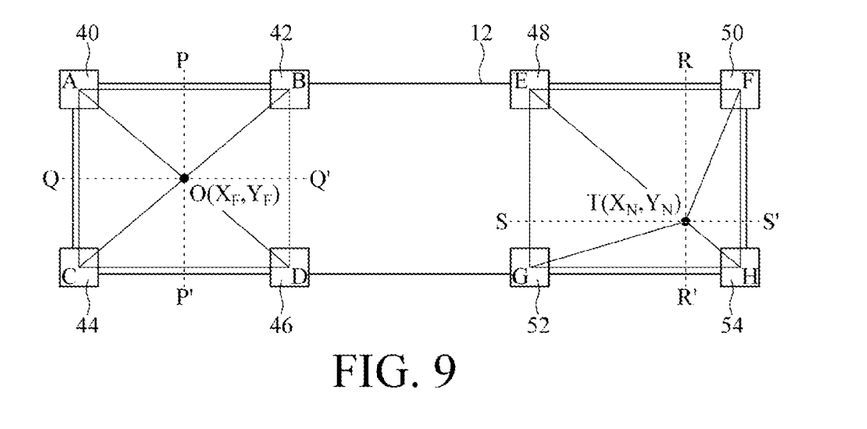
FIG. 9 is a schematic architectural diagram of calculating touch pressure information according to an embodiment of the disclosure.

Referring to FIG. 4 and FIG. 9, according to pressure signals generated by the first pressure detecting element 40, the second pressure detecting element 42, the third pressure detecting element 44, and the fourth pressure detecting element 46 of the first pressure sensitive input region 56, the second pressure detecting element 42, the fourth pressure detecting element 46, the fifth pressure detecting element 48, and the seventh pressure detecting element 52 of the second pressure sensitive input region 58, and the fifth pressure detecting element 48, the sixth pressure detecting element 50, the seventh pressure detecting element 52, and the eighth pressure detecting element 54 of the third pressure sensitive input region 60, the pressure control unit 20 further calculates touch pressure information with coordinate positions as auxiliary interpretation of the touch position. When the user presses in any region, the pressure detecting elements 40 to 54 detect different levels of pressure signals. A detected pressure value is greater when closer to a pressing point.

An example is used in which a load digit value of each point is a maximum load resolution of 1024 step detected under 10-bits. The first pressure detecting element 40, the second pressure detecting element 42, the third pressure detecting element 44, and the fourth pressure detecting element 46 in the first pressure sensitive input region 56 are used as an example. The first pressure detecting element 40, the second pressure detecting element 42, the third pressure detecting element 44, and the fourth pressure detecting element 46 are respectively four detection points A, B, C, and D located at four corners of the first pressure sensitive input region 56 in sequence. The detection point A is used as an origin. A position at which the pressure signal is generated in the first pressure sensitive input region 56 is a pressing point O. Coordinates of the pressing point O are O ($X_F$, $Y_F$). When the first pressure sensitive input region 56 includes a two-dimensional coordinate resolution (1024×1024), the pressure control unit 20 performs the following operation: first, respectively obtaining load digit values of a line segment OA, a line segment OB, a line segment OC, and a line segment OD according to a maximum load resolution of the first pressure detecting element 40, the second pressure detecting element 42, the third pressure detecting element 44, or the fourth pressure detecting element 46, and the position of the pressing point O. In this embodiment, it is assumed that the maximum load resolution is 1024. Because the pressing point O is a central point position of the first pressure sensitive input region 56, the load digit values of the line segment OA, the line segment OB, the line segment OC, and the line segment OD load are all 512 (represented as $\overline{OA}$=512, $\overline{OB}$=512, $\overline{OC}$=512, and $\overline{OD}$=512) according to the position of the pressing point O. A vertical projection of the pressing point O on the line segment AB corresponds to a point P. A vertical projection of the pressing point O on the line segment AC corresponds to a point Q. A load digit value of a line segment AP, a load digit value of a line segment BP, a load digit value of a line segment AQ, and a load digit value of a line segment CQ are derived according to the load digit values of the line segment OA, the line segment OB, the line segment OC, and the line segment OD. Next, the touch pressure information of the pressing point O is obtained according to the load digit value of the line segment AP, the load digit value of the line segment AB, the load digit value of the line segment AQ, the load digit value of the line segment AC, and the maximum load resolution. The entire detailed process is expressed by the following equations (1) and (2):

$$\begin{cases} \overline{AP} = \dfrac{\overline{OB}}{(\overline{OA}+\overline{OB})} \times \overline{AB} \\ \overline{BP} = \dfrac{\overline{OA}}{(\overline{OA}+\overline{OB})} \times \overline{AB} \end{cases} \Rightarrow X_F = 0 + \left(\dfrac{\overline{AP}}{\overline{AB}} \times 1024\right) \quad (1)$$

$$\begin{cases} \overline{AQ} = \dfrac{\overline{OC}}{(\overline{OA}+\overline{OC})} \times \overline{AC} \\ \overline{CQ} = \dfrac{\overline{OA}}{(\overline{OA}+\overline{OC})} \times \overline{AC} \end{cases} \Rightarrow Y_F = 0 + \left(\dfrac{\overline{AQ}}{\overline{AC}} \times 1024\right) \quad (2)$$

Therefore, $$X_F = 0 + \left(\dfrac{512}{512+512} \times 1024\right) = 512 \text{ and}$$

$$Y_F = 0 + \left(\dfrac{512}{512+512} \times 1024\right) = 512,$$

and the touch pressure information O (512, 512) of the pressing point O is obtained.

In an embodiment, the fifth pressure detecting element 48, the sixth pressure detecting element 50, the seventh pressure detecting element 52, and the eighth pressure detecting element 54 are respectively four detection points E, F, G, and H located at four corners of the third pressure sensitive input region 60. The detection point E is used as an origin. It is assumed that a position at which the pressure signal is generated in the third pressure sensitive input region 60 is a pressing point T. Coordinates of the pressing point T are T ($X_N$, $Y_N$). When the third pressure sensitive input region 60 includes a two-dimensional coordinate resolution (1024×1024), the pressure control unit 20 performs the following steps: first, respectively obtaining load digit values of a line segment TE, a line segment TF, a line segment TG, and a line segment TH according to a maximum load resolution of the fifth pressure detecting element 48, the sixth pressure detecting element 50, the seventh pressure detecting element 52, or the eighth pressure detecting element 54, and the position of the pressing point T. It is assumed that the maximum load resolution is 1024, the load digit values of the line segment TE, the line segment TF, the line segment TG, and the line segment TH are respectively 124, 350, 400, and 900 (represented as $\overline{TE}$=124, $\overline{TF}$=350, $\overline{TG}$=400, and $\overline{TH}$=900). A vertical projection of the pressing point T on the line segment EF corresponds to a point R. A vertical projection of the pressing point T on the line segment EG corresponds to a point S. A load digit value of a line segment ER, a load digit value of a line segment FR, a load digit value of a line segment ES, and a load digit value of a line segment GS are derived according to the load digit values of the line segment TE, the line segment TF, the line segment TG, and the line segment TH. Next, the touch pressure information of the pressing point T is obtained according to the load digit value of the line segment ER, the load digit value of the line segment EF, the load digit value of the line segment ES, the load digit value of the line segment EG, and the maximum load resolution. The entire detailed process is expressed by the following equations (3) and (4):

$$\begin{cases} \overline{ER} = \dfrac{\overline{TF}}{(\overline{TE}+\overline{TF})} \times \overline{EF} \\ \overline{FR} = \dfrac{\overline{TE}}{(\overline{TE}+\overline{TF})} \times \overline{EF} \end{cases} \Rightarrow X_N = 0 + \left(\dfrac{\overline{ER}}{\overline{EF}} \times 1024\right) \quad (3)$$

$$\begin{cases} \overline{ES} = \dfrac{\overline{TG}}{(\overline{TE}+\overline{TG})} \times \overline{EG} \\ \overline{GS} = \dfrac{\overline{TE}}{(\overline{TE}+\overline{TG})} \times \overline{EG} \end{cases} \Rightarrow Y_N = 0 + \left(\dfrac{\overline{ES}}{\overline{EG}} \times 1024\right) \quad (4)$$

Therefore, $$X_N = 0 + \left(\dfrac{350}{124+350} \times 1024\right) = 756 \text{ and}$$

$$Y_N = 0 + \left(\dfrac{400}{400+124} \times 1024\right) = 782,$$

and the touch pressure information T (756, 782) of the pressing point T is obtained.

Figure 10:
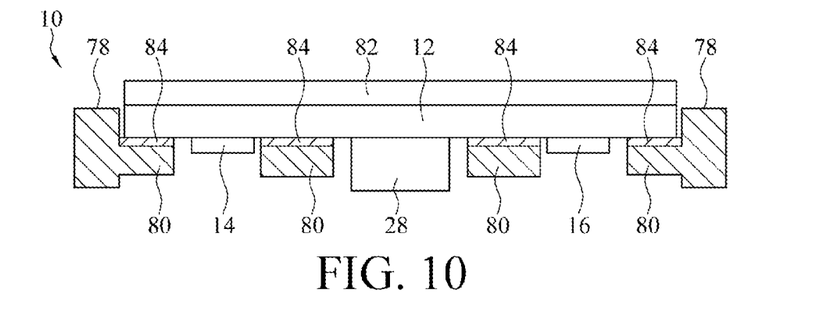
FIG. 10 is a structural cross-sectional view of a touchpad device according to an embodiment of the disclosure.

In addition, the touchpad device 10 of FIG. 2 is used as an embodiment, referring to FIG. 10 for a structural cross-sectional view of the touchpad device 10 of the disclosure. In the touchpad device 10, the touch circuit board 12 is located on a supporting base 80 on two sides of a keyboard frame 78. A surface cover plate 82 is further provided on an upper surface of the touch circuit board 12. The pressure detecting elements 14 and 16, and the actuating feedback element 28 are located on a lower surface of the touch circuit board 12. The actuating feedback element 28 is located between the pressure detecting elements 14 and 16. A buffer layer 84 is disposed between the touch circuit board 12 and the supporting base 80 to provide buffering.

Figure 11:
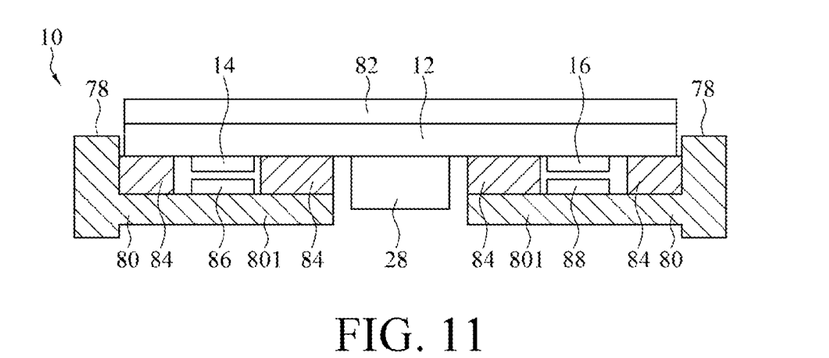
FIG. 11 is a structural cross-sectional view of a touchpad device according to another embodiment of the disclosure.

In an embodiment, referring to FIG. 11, in the touchpad device 10, the touch circuit board 12 is located on a supporting base 80 on two sides of a keyboard frame 78. A surface cover plate 82 is provided on an upper surface of the touch circuit board 12. The pressure detecting elements 14 and 16, and the actuating feedback element 28 are located on a lower surface of the touch circuit board 12. The actuating feedback element 28 is located between the pressure detecting elements 14 and 16. A supporting portion 801 extends from the supporting base 80 to the direction of the actuating feedback element 28. The supporting portion 801 extends below the pressure detecting elements 14 and 16. A buffer layer 84 is disposed between the touch circuit board 12 and the supporting base 80 and the supporting portion 801. Upward urging elements 86 and 88 are disposed on the supporting portion 801 to respectively correspond to the pressure detecting elements 14 and 16, to provide upward urging support required when the pressure detecting elements 14 and 16 are pressed down.

Figure 12:
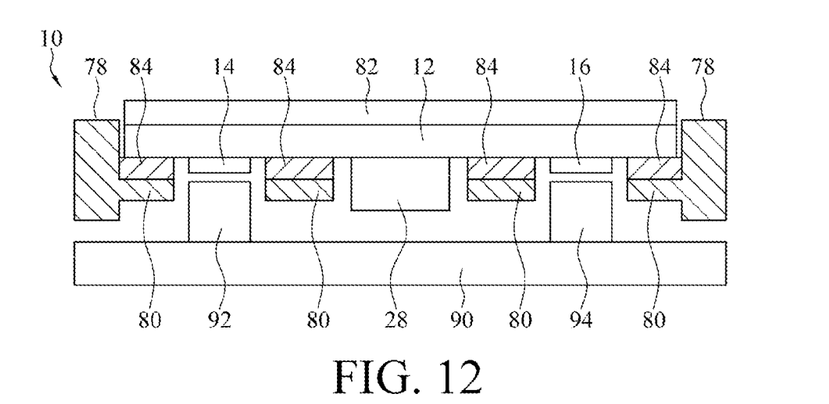
FIG. 12 is a structural cross-sectional view of a touchpad device according to still another embodiment of the disclosure.

In another embodiment, referring to FIG. 12, in the touchpad device 10, the touch circuit board 12 is located on a supporting base 80 on two sides of a keyboard frame 78. A surface cover plate 82 is provided on an upper surface of the touch circuit board 12. The pressure detecting elements 14 and 16, and the actuating feedback element 28 are located on a lower surface of the touch circuit board 12. The actuating feedback element 28 is located between the pressure detecting elements 14 and 16. A buffer layer 84 is disposed between the touch circuit board 12 and the supporting base 80. In addition, a base shell 90 is further disposed below the keyboard frame 78. Supporting blocks 92 and 94 respectively protrude from the base shell 90 at positions corresponding to the pressure detecting elements 14 and 16, so that the supporting block 92 and 94 respectively correspond to the pressure detecting elements 14 and 16 above, to provide upward urging support required when the pressure detecting elements 14 and 16 are pressed down.

Referring to FIG. 10 to FIG. 12, because the pressure detecting elements 14 and 16, and the actuating feedback element 28 are used to replace the conventional mechanical switches in the disclosure, the touchpad device 10 of the disclosure is stacked in a thinner manner, to reduce an overall thickness of the mechanism.

To sum up, while providing a large-sized touchpad device, the disclosure provides a more diversified and intuitive input manner, and further provides a press feedback mechanism to meet requirements of the users. In addition, the disclosure can further reduce an overall thickness of a mechanism and provide multi-region input scenarios.

The embodiments described above are only used for explaining the technical ideas and characteristics of the disclosure to enable a person skilled in the art to understand and implement the content of the disclosure, and are not intended to limit the patent scope of the disclosure. That is, any equivalent change or modification made according to the spirit disclosed in the disclosure shall still fall within the patent scope of the disclosure.

What is claimed is:

1. A touchpad device, comprising:
   a touch circuit board, comprising a touchable zone;
   at least two pressure detecting elements, located below the touch circuit board and corresponding to at least one pressure sensitive input region in the touchable zone;
   a touch controller, electrically connected to the touch circuit board and configured to receive and process a touch signal from the touch circuit board to generate touch coordinate information;
   a pressure controller, electrically connected to the pressure detecting elements and configured to receive and process a pressure signal detected by the pressure detecting elements in the pressure sensitive input region to generate touch pressure information;
   a driving device and at least one actuating feedback element, wherein the driving device is electrically connected to the actuating feedback element to drive, according to the pressure signal, the actuating feedback element to actuate, wherein the pressure detecting elements comprise at least six pressure detecting elements to form at least two pressure sensitive input regions, and the pressure sensitive input regions each correspond to one the actuating feedback element; and
   a processor electrically connected to the touch controller, the pressure controller, and the driving device, wherein the processor determines, according to the touch coordinate information and the touch pressure information, the pressure sensitive input region in which a corresponding touch occurs, to generate a control signal to the driving device, and the driving device drives the actuating feedback element corresponding to the pressure sensitive input region.

2. The touchpad device according to claim 1, wherein the pressure controller is electrically connected to the driving device to enable the driving device according to the pressure signal.

3. The touchpad device according to claim 1, wherein the actuating feedback element is located below the touch circuit board, and a vertical projection of the actuating feedback element on the touch circuit board overlaps the pressure sensitive input region.

4. The touchpad device according to claim 1, wherein the at least two pressure detecting elements respectively correspond to a pressure sensitive input region in the touchable zone, to respectively serve as a left pressure sensitive input region and a right pressure sensitive input region.

5. The touchpad device according to claim 4, wherein the actuating feedback element is located below the touch circuit board and corresponds to both the left pressure sensitive input region and the right pressure sensitive input region.

6. The touchpad device according to claim 3, wherein the touch circuit board is located on a supporting base on two sides of a keyboard frame, the pressure detecting elements and the actuating feedback element are located on a lower surface of the touch circuit board, and the actuating feedback element is located between the pressure detecting elements.

7. The touchpad device according to claim 6, wherein a surface cover plate is further provided on an upper surface of the touch circuit board.

8. The touchpad device according to claim 6, wherein a buffer layer is further provided between the touch circuit board and the supporting base.

9. The touchpad device according to claim 8, wherein a supporting portion extends from the supporting base to extend below the pressure detecting elements, and upward urging elements are disposed on the supporting portion to respectively correspond to the pressure detecting elements.

10. The touchpad device according to claim 8, wherein a base shell is further disposed below the keyboard frame, and supporting blocks respectively protrude from the base shell at positions corresponding to the pressure detecting elements.

11. A touchpad device, comprising:
a touch circuit board, comprising a touchable zone;
at least two pressure detecting elements, located below the touch circuit board and corresponding to at least one pressure sensitive input region in the touchable zone;
a touch controller, electrically connected to the touch circuit board and configured to receive and process a touch signal from the touch circuit board to generate touch coordinate information;
a pressure controller, electrically connected to the pressure detecting elements and configured to receive and process a pressure signal detected by the pressure detecting elements in the pressure sensitive input region to generate touch pressure information; and
a driving device and at least one actuating feedback element, wherein the driving device is electrically connected to the actuating feedback element to drive, according to the pressure signal, the actuating feedback element to actuate;
wherein the pressure detecting elements comprise at least six pressure detecting elements to form at least two pressure sensitive input regions, and the pressure sensitive input regions each correspond to one the actuating feedback element;
wherein the touch circuit board is located on a supporting base on two sides of a keyboard frame, the pressure detecting elements and the actuating feedback element are located on a lower surface of the touch circuit board, and the actuating feedback element is located between the pressure detecting elements; and
wherein the supporting base further respectively extends a supporting portion to the direction of the actuating feedback element, so the supporting portion extends below the pressure detecting elements, and at least two upward urging elements are disposed on the supporting portions to respectively correspond to the pressure detecting elements.

12. A touchpad device, comprising:
a touch circuit board, comprising a touchable zone;
at least two pressure detecting elements, located below the touch circuit board and corresponding to at least one pressure sensitive input region in the touchable zone;
a touch controller, electrically connected to the touch circuit board and configured to receive and process a touch signal from the touch circuit board to generate touch coordinate information; and
a pressure controller, electrically connected to the pressure detecting elements and configured to receive and process a pressure signal detected by the pressure detecting elements in the pressure sensitive input region to generate touch pressure information;
wherein the pressure detecting elements comprise four pressure detecting elements to form the pressure sensitive input region and detect the pressure signal generated in the pressure sensitive input region;
wherein the four pressure detecting elements are four detection points A, B, C, and D respectively located at four corners of the pressure sensitive input region, the detection point A is used as an origin, a position at which the pressure signal is generated is a pressing point O, the pressure sensitive input region comprises a two-dimensional coordinate resolution, and the pressure controller performs the following operations:
respectively obtaining load digit values of a line segment OA, a line segment OB, a line segment OC, and a line segment OD according to a maximum load resolution of the four pressure detecting elements and the position of the pressing point O;
a vertical projection of the pressing point O on the line segment AB corresponding to a point P, and a vertical projection of the pressing point O on the line segment AC corresponding to a point Q; deriving a load digit value of a line segment AP, a load digit value of a line segment BP, a load digit value of a line segment AQ, and a load digit value of a line segment CQ according to the load digit values of the line segment OA, the line segment OB, the line segment OC, and the line segment OD; and
obtaining the touch pressure information of the pressing point O according to the load digit value of the line segment AP, the load digit value of the line segment AB, the load digit value of the line segment AQ, the load digit value of the line segment AC, and the maximum load resolution.

* * * * *